United States Patent
Lin (10) Patent No.: US 9,753,485 B2
(45) Date of Patent: Sep. 5, 2017

(54) DATA PROCESSING METHOD AND APPARATUS FOR WRITING DATA INTO A MEMORY ACCORDING TO A CLOCK SIGNAL

(71) Applicant: Novatek Microelectronics Corp., Hsinchu (TW)

(72) Inventor: Pao-Yen Lin, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 282 days.

(21) Appl. No.: 14/038,751

(22) Filed: Sep. 27, 2013

(65) Prior Publication Data

US 2015/0039928 A1 Feb. 5, 2015

(30) Foreign Application Priority Data

Jul. 30, 2013 (TW) .............................. 102127309 A (51) Int. Cl.
| | | |
|---|---|---|
| G06F 1/04 | (2006.01) | |
| G06F 1/12 | (2006.01) | |
| G06F 5/06 | (2006.01) | |
| G06F 1/10 | (2006.01) | |
| H04N 21/4363 | (2011.01) | |

(52) U.S. Cl.
CPC ......... *G06F 1/10* (2013.01); *H04N 21/43632* (2013.01)

(58) Field of Classification Search
CPC ...... G06F 7/00; G06F 12/04; G06F 2212/401; G06F 9/30178; H04N 19/61; H04N 19/91; H04N 19/40
See application file for complete search history.

(56) References Cited

U.S. PATENT DOCUMENTS

| | | | | |
|---|---|---|---|---|
| 4,954,825 A | * | 9/1990 | Chi .......................... | H03M 5/12 341/52 |
| 5,321,749 A | * | 6/1994 | Virga ...................... | G09C 5/00 283/73 |
| 6,021,162 A | * | 2/2000 | Gaboury ............. | H04L 27/1563 375/242 |
| 6,163,576 A | * | 12/2000 | Lempel .................. | H04N 19/51 375/240.24 |
| 6,590,503 B1 | * | 7/2003 | Elliott .................... | G08C 19/28 340/12.26 |

(Continued)

FOREIGN PATENT DOCUMENTS

| | | |
|---|---|---|
| CN | 1279854 | 1/2001 |
| CN | 1592287 | 3/2005 |

OTHER PUBLICATIONS

"Office Action of China Counterpart Application", issued on Jul. 5, 2016, p. 1-p. 6.

*Primary Examiner* — Thomas Lee
*Assistant Examiner* — Zhipeng Wang
(74) *Attorney, Agent, or Firm* — Jianq Chyun IP Office (57) ABSTRACT

A data processing method and apparatus are provided. The data processing apparatus includes a converter module and a control module. The converter module receives a clock signal through a pin, and decides a bit value of the first data according to a length of a corresponding period of the clock signal. The control module determines whether to perform a bit writing operation for writing the bit value into a memory according to the clock signal and the first data.

26 Claims, 4 Drawing Sheets

(56) References Cited

U.S. PATENT DOCUMENTS

| | | | |
|---|---|---|---|
| 7,322,040 B1 | 1/2008 | Olson et al. | |
| 7,369,629 B2 | 5/2008 | Umewaka | |
| 7,801,308 B1 | 9/2010 | Hang | |
| 2002/0041527 A1* | 4/2002 | Tanaka | G11C 16/12 365/200 |
| 2002/0141589 A1 | 10/2002 | Garay et al. | |
| 2005/0084041 A1* | 4/2005 | Umewaka | H04L 25/4902 375/334 |
| 2006/0250915 A1* | 11/2006 | Park | G11B 7/0053 369/53.34 |
| 2007/0216438 A1* | 9/2007 | Gupta | G01R 31/3172 324/762.02 |
| 2008/0309818 A1* | 12/2008 | Weng | H03L 7/08 348/537 |
| 2009/0135307 A1* | 5/2009 | Kurita | H04N 5/44 348/729 |
| 2009/0140774 A1* | 6/2009 | Kotowski | G06F 13/4295 327/47 |
| 2009/0238277 A1* | 9/2009 | Meehan | H04N 19/124 375/240.16 |
| 2010/0163631 A1* | 7/2010 | Ishii | G06K 19/0701 235/492 |
| 2013/0182349 A1* | 7/2013 | Tagami | G11B 20/10222 360/51 |
| 2013/0318319 A1* | 11/2013 | Patocka | G06F 12/1425 711/163 |

* cited by examiner

DATA PROCESSING METHOD AND APPARATUS FOR WRITING DATA INTO A MEMORY ACCORDING TO A CLOCK SIGNAL

CROSS-REFERENCE TO RELATED APPLICATION

This application claims the priority benefit of Taiwan application serial no. 102127309, filed on Jul. 30, 2013. The entirety of the above-mentioned patent application is hereby incorporated by reference herein and made a part of this specification.

BACKGROUND

Technical Field

The invention relates to an electronic apparatus. Particularly, the invention relates to a data processing method and an apparatus.

Related Art

In recent years, as customers have increasing demand on quality of multimedia data, transmission interface of the multimedia data is quickly developed. When the multimedia data is transmitted through a high resolution interface, a high-bandwidth digital content protection (HDCP) is usually used to prevent data from being stolen. When a user wants to watch the data protected by the HDCP, the user has to use a playing device and a display device inbuilt with a HDCP key. The playing device and the display device have to perform an authentication process for exchanging keys in order to successfully play the data. If a problem is occurred during the authentication process, the data protected by the HDCP may have problems of low resolution, poor sound quality or unable to be played when the data is played. A HDCP key set is generally composed of 40 keys of 56 bits. A production machine or a test machine can write the keys into a memory of a circuit to be tested (for example, the playing device and/or the display device) through a manner of one bit after another.

Figure 1:
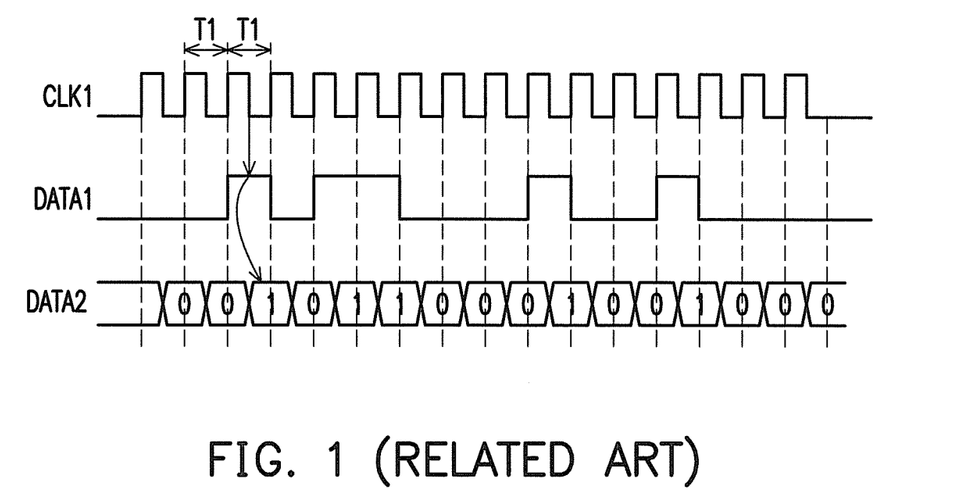
FIG. 1 is a schematic diagram of an example of conventional signal timing between a test machine and a circuit to be tested.

The test machine may write data (for example, the HDCP key or other data) into the memory of the circuit to be tested through a plurality of pins, so as to perform function test on the circuit to be tested. For example, FIG. 1 is a schematic diagram of an example of conventional signal timing between the test machine and the circuit to be tested. In order to perform a function test, a data pin used for transmitting data DATA1 and other control pins (for example, a clock pin used for transmitting a clock signal CLK1) are configured between the test machine and the circuit to be tested. The circuit to be tested receives the clock signal CLK1 through the clock pin, and receives the data DATA1 through the data pin. The circuit to be tested can sample/latch a bit value of the data DATA1 according to a timing of the clock signal CLK1, so as to generate corresponding data DATA2 in internal of the circuit to be tested. Besides the clock signal CLK1 and the data DATA1, the test machine further provides a plurality of programming signals of different functions to the memory in internal of the circuit to be tested. Through control of the programming signals output by the test machine, the circuit to be tested can write the data DATA2 into the memory in internal of the circuit to be tested. Therefore, besides the pin used for transmitting the clock signal CLK1 and the pin used for transmitting the data DATA1, a plurality of control pins are configured between the test machine and the circuit to be tested for transmitting the programming signals to the memory in internal of the circuit to be tested.

On the other hand, the memory of the circuit to be tested (for example, the playing device and/or the display device) can be a memory device/circuit of any type, for example, a one-time programmable (OTP) memory or other non-volatile memory. The bit writing operation (to write the keys into the OTP memory) generally consumes a plenty of time. When the data DATA2 is written into the OTP memory, the test machine generally writes the data DATA2 into the OTP memory in a way of one bit each time. When a data amount of the data DATA2 to be written into the OTP memory is huge, for example, when a HDCP key set composed of 40 keys of 56 bits is to be written into the OTP memory, or when a plurality of HDCP key sets are to be written into the OTP memory, the test machine has to consume a plenty of time to write the data DATA2 with the huge data amount into the OTP memory. In the embodiment of FIG. 1, a time length of each period of the clock signal CLK1 is T1. In order to ensure that each bit has enough time to complete the bit writing operation, the time length T1 of each period of the clock signal CLK1 has to be greater than a rated time length of the bit writing operation.

SUMMARY

The invention is directed to a data processing method and an apparatus, which is capable of decreasing a time and/or a number of pins used for transmitting data from external to internal of a chip.

The invention provides a data processing method including following steps. A clock signal is received through a pin of an integrated circuit. A bit value of first data is determined according to a time length of a corresponding period of the clock signal. It is determined whether to perform a bit writing operation for writing the bit value into a memory according to the clock signal and the first data.

The invention provides a data processing apparatus including a converter module and a control module. A first terminal of the converter module receives a clock signal. The converter module determines a bit value of first data according to a time length of a corresponding period of the clock signal. The control module is coupled to the converter module, and determines whether to perform a bit writing operation for writing the bit value into a memory according to the clock signal and the first data.

According to the above descriptions, in the data processing method and the data processing apparatus of the invention, by modulating the time length of the period of the clock signal, the time required for transmitting/processing data is decreased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the aforementioned embodiment of FIG. 1, a time length of each period of a clock signal CLK1 is T1. In order to ensure each bit has enough time to complete a bit writing operation, the time length T1 of each period of the clock signal CLK1 has to be greater than a rated time length of the bit writing operation. However, only when a bit value is a first logic value (i.e. the bit value requiring the bit writing operation), the period of the bit value requires the time length T1. When a bit value is a second logic value (i.e. the bit value not requiring the bit writing operation), regarding such bit value, the period of the time length T1 is obviously too much since such bit value does not require the bit writing operation. If a transmission time for transmitting the data DATA1 to a circuit to be tested can be shorted, and/or the operation time for writing the data DATA2 into a one-time programmable (OTP) memory in the circuit to be tested can be decreased, and/or the number of the pins required from transmitting data and related control signals to the circuit to be tested can be decreased, the device cost can be effectively saved.

Figure 2:
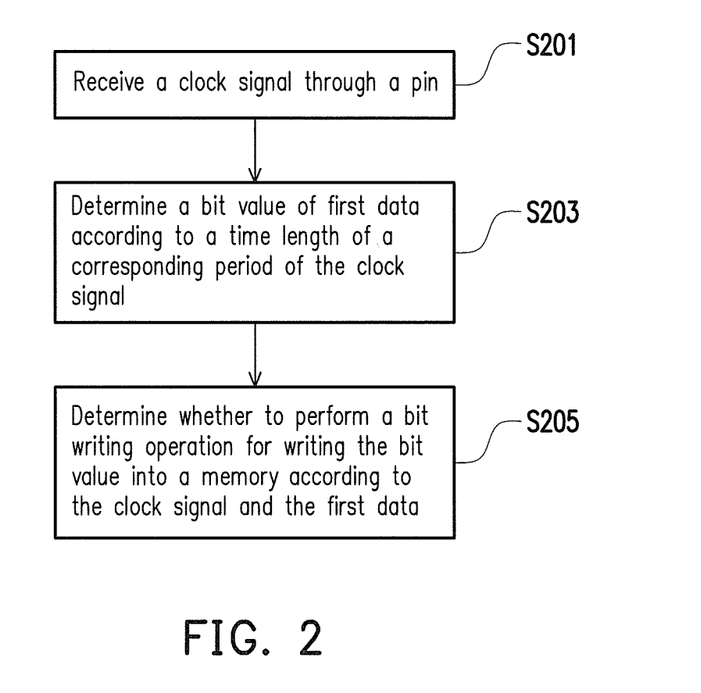
FIG. 2 is a flowchart illustrating a data processing method according to an embodiment of the invention.
Figure 3:
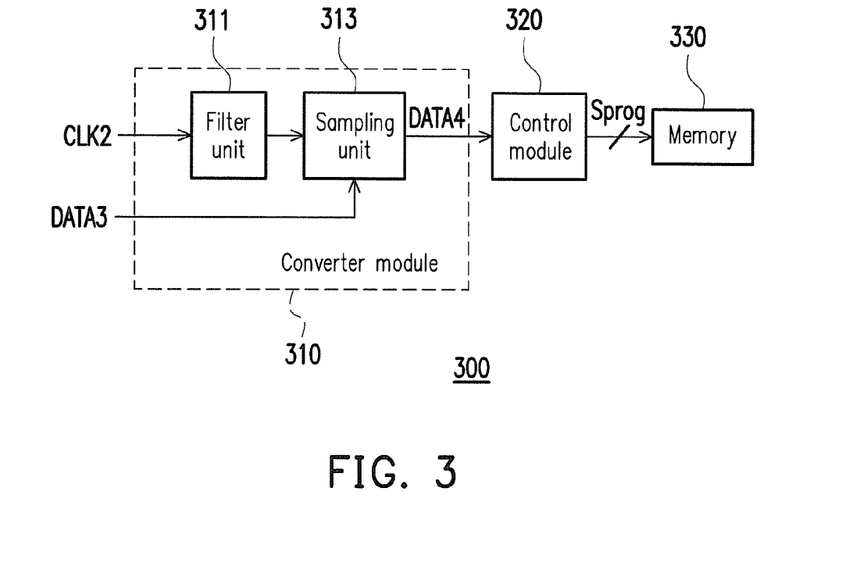
FIG. 3 is a circuit block schematic diagram of a data processing apparatus according to a first embodiment of the invention.
Figure 4:
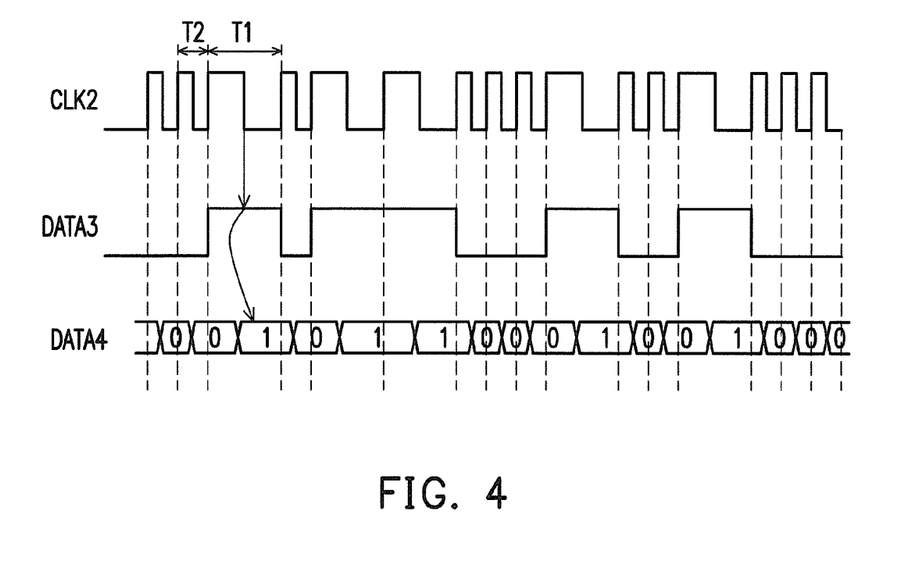
FIG. 4 is a schematic diagram of signal timing of the data processing apparatus of FIG. 3 according to an embodiment of the invention.

FIG. 2 is a flowchart illustrating a data processing method according to an embodiment of the invention. FIG. 3 is a circuit block schematic diagram of a data processing apparatus 300 according to a first embodiment of the invention. The data processing apparatus 300 includes a converter module 310, a control module 320 and a memory 330. FIG. 4 is a schematic diagram of signal timing of the data processing apparatus 300 of FIG. 3 according to an embodiment of the invention. Referring to FIG. 2, FIG. 3 and FIG. 4, the converter module 310 receives a clock signal CLK2 through a clock pin (step S201), and the converter module 310 receives data DATA3 through a data pin. The data DATA3 can be data signal of any type or any content, for example, the data DATA3 can be an encryption and decryption key (for example, HDCP key or other encryption and decryption key). Now, the clock signal CLK2 and the data DATA3 can be provided by a previous-stage circuit in the data processing device 300, or can be provided by an external circuit (for example, a production machine or a test machine) of the data processing apparatus 300.

The clock signal CLK2 has a plurality of periods. The converter module 310 determines a bit value of the data DATA4 according to a time length of the corresponding period of the clock signal CLK2 (step S203). For example, in the present embodiment, the data processing apparatus 300 can sample/latch the bit value of the data DATA3 according a timing (for example, timing of a falling edge) of the clock signal CLK2, so as to generate corresponding data DATA4 in internal of the data processing apparatus 300.

The control module 320 is coupled to the converter module 310 for receiving the data DATA4 and other related control/trigger signals (which are not shown) output by the converter module 310. The control module 320 determines whether to perform the bit writing operation according to the clock signal CLK2 and the data DATA4. In the present embodiment, the control module 320 may generate a plurality of programming signals Sprog of different functions to the memory 330 according to the data DATA4 provided by the converter module 310. For example, when the bit value of the data DATA4 is a first logic value (i.e. a bit value requiring the bit writing operation, for example, logic 1), the control module 320 can perform the bit writing operation to a certain bit in the memory 330 according to a setting of the programming signals Sprog, so as to write the first logic value to the corresponding bit in the memory 330. For another example, when the bit value of the data DATA4 is a second logic value (i.e. a bit value not requiring the bit writing operation, for example, logic 0), the control module 320 can adjust the programming signal Sprog to maintain a certain bit in the memory 330 in an initial state (i.e. not to perform the bit writing operation), so as to maintain the corresponding bit of the memory 330 to the second logic value (the initial state). Therefore, the control module 320 determines whether to perform the bit writing operation according to the clock signal CLK2 and the data DATA4, so as to write the bit value of the data DATA4 into the memory 330 (step S205).

The memory 330 can be a memory device/circuit of any type, for example, a one-time programmable (OTP) memory or other non-volatile memory. The OTP memory may adopts E-fuses or other memory devices having the similar function to record data. For example, the system may define a logic value of a trim state (a blown state) of the E-fuse to be the first logic value (for example, logic 1), and define the logic value of the initial state (a not blown state) of the E-fuse to be the second logic value (for example, logic 0). In other embodiments, the first logic value can be logic 0, and the second logic value can be logic 1. Since the process of blowing the E-fuse is irreversible, information written into the OTP memory is permanent.

The embodiment of FIG. 4 can be deduced according related descriptions of FIG. 1. Different to the embodiment of FIG. 1, the period of the clock signal CLK2 shown in FIG. 4 has been modulated. When the bit value of the data DATA3 is the first logic value (i.e. the bit value requiring the bit writing operation, for example, logic 1), the time length of the corresponding period of the bit value is T1 (shown in FIG. 4), where the time length T1 has to be greater than a rated time length of the bit writing operation. Therefore, the control module 320 has enough time length T1 to perform the bit writing operation, so as to write the bit value having the first logic value to the memory 330. When the bit value of the data DATA3 is the second logic value (i.e. the bit value not requiring the bit writing operation, for example, logic 0), the time length of the corresponding period of the bit value is T2 (shown in FIG. 4), where the time length T2 is smaller than the rated time length of the bit writing operation, so that the bit value does not require the bit writing operation. Since the time length of the corresponding period of the bit value having the second logic value in the clock signal CLK2 and the data DATA3 is shortened to T2, a transmission time for transmitting the data DATA3 to the converter module 310 is shortened. Further, the control module 320 determines whether to perform the bit writing operation to the memory 330 according to the bit value of the data DATA4. For example, when the bit value of the data DATA4 is the second logic value (i.e. the bit value not requiring the bit writing operation, for example, logic 0), the control module 320 can reset a timer of the bit writing operation to end a current bit writing operation early and address a next bit to prepare a next bit writing operation. Therefore, the data processing device 300 can reduce an operation time for writing the data DATA4 into the memory 330.

The converter module 310 can be implemented through any method. For example, in the embodiment of FIG. 3, the converter module 310 includes a filter unit 311 and a sampling unit 313. In the invention, the filter unit 311 is, for example, a high-pass filter, a bandpass filter, a low-pass filter or other filtering circuits, and the sampling unit 313 is, for example, a latch, a flip-flop or other sampling/latch circuits.

A first terminal of the filter unit 311 is coupled to a clock pin of the converter module 310 to receive the external clock signal CLK2. Then, the filter unit 311 filters noise in the clock signal CLK2. The sampling unit 313 is coupled to a second terminal of the filter unit 311 for receiving the noise-filtered clock signal CLK2. The sampling unit 313 is further coupled to a data pin of the converter module 310 for receiving the data signal (for example, the data DATA3). The sampling unit 313 samples the data signal DATA3 according to a timing of the clock signal CLK2 to obtain a logic value of the data DATA4, and transmits the data DATA4 to the control module 320.

In step S205, after the control module 320 receives the logic value of the data DATA4, a timer (or a counter) in internal of the control module 320 starts to count a waiting time for waiting to complete the bit writing operation. When the bit value of the data DATA4 is the first logic value (i.e. the bit value requiring the bit writing operation, for example, logic 1), before the waiting time counted by the timer reaches a rated time (for example, several microseconds) of the bit writing operation, the control module 320 does not reset the waiting time counted by the timer, so as to facilitate the control module 320 performing the bit writing operation on the bit value, i.e. write the bit value into the memory 330. When the bit value of the data DATA4 is the second logic value (i.e. the bit value not requiring the bit writing operation, for example, logic 0), since the control module 320 is not required to perform the bit writing operation on the bit value, the control module 320 immediately resets the waiting time counted by the timer to end the bit writing operation early and addresses a next bit to prepare processing a next bit value. Therefore, the data processing device 300 can reduce the operation time for writing the data DATA4 into the memory 330.

In the example of FIG. 1, a plurality of control pins are configured between the conventional testing matching and the conventional circuit to be tested for transmitting a plurality of programming signals of different functions (or one bus signal) to the memory in internal of the circuit to be tested. The conventional test machine may generate the programming signals to control the memory in internal of the circuit to be tested to perform the bit writing operation. However, the conventional test machine has to spend a lot of time to convert data to be written (for example, a test pattern) into the programming signal. In the embodiment of FIG. 3 and FIG. 4, a previous-stage circuit (for example, the test machine) of the data processing apparatus 300 is only required to sequentially arrange the data to be written in the data DATA3, and transmits the data DATA3 to the converter module 310, and the converter module 310 may generate the corresponding data DATA4 to the control module 320. The control module 320 can generate the programming signal Sprog to the memory 330 according to the data DATA4. Namely, the previous-stage circuit (for example, the test machine) of the data processing circuit 300 is unnecessary to generate the programming signals Sprog. Therefore, the number of the control pins required by the previous-stage circuit (for example, the test machine) is reduced and the time required for converting the test pattern into the corresponding programming signal is saved. Moreover, a data amount of the test pattern generated by the previous-stage circuit (for example, the test machine) of the data processing circuit 300 in the embodiment of FIG. 3 and FIG. 4 can be smaller than a data amount of the test pattern generated by the conventional test machine of the embodiment of FIG. 1.

Figure 5:
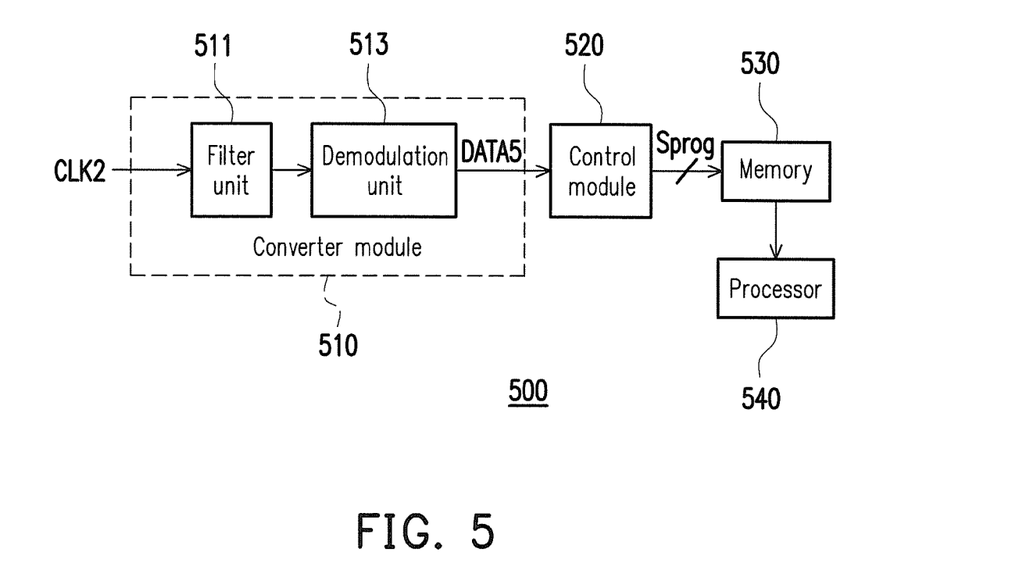
FIG. 5 is a circuit block schematic diagram of a data processing apparatus according to a second embodiment of the invention.

Implementation of the data processing apparatus is not limited to the embodiment of FIG. 3. For example, FIG. 5 is a circuit block schematic diagram of a data processing apparatus 500 according to a second embodiment of the invention. The data processing apparatus 500 includes a converter module 510, a control module 520, a memory 530 and a processor 540. Descriptions of the converter module 510, the control module 520 and the memory 530 of FIG. 5 can be deduced according to related descriptions of the converter module 310, the control module 320 and the memory 330 of FIG. 3. Related descriptions of FIG. 2 are also adapted to the embodiment of FIG. 5. Different to the embodiment of FIG. 3, in the embodiment of FIG. 5, the data DATA3 and the related data pin of FIG. 3 are omitted.

Figure 6:
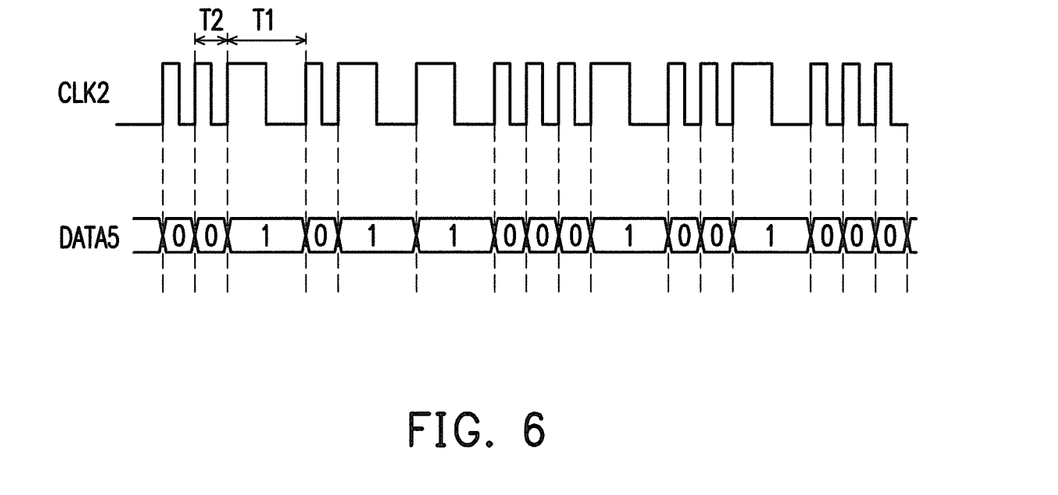
FIG. 6 is a schematic diagram of signal timing of the data processing apparatus of FIG. 5 according to another embodiment of the invention.

FIG. 6 is a schematic diagram of signal timing of the data processing apparatus of FIG. 5 according to another embodiment of the invention. The embodiment of FIG. 6 can be deduced according to related descriptions of the embodiment of FIG. 4. Referring to FIG. 2, FIG. 5 and FIG. 6, in the present embodiment, the converter module 510 includes a filter unit 511 and a demodulation unit 513. The modulated clock signal CLK2 is loaded with data (information). A first terminal of the filter unit 511 is coupled to the clock pin of the converter module 510 for receiving the external clock signal CLK2 (step S201). The filter unit 511 filters the noise in the clock signal CLK2. The noise-filtered clock signal CLK2 is transmitted to the demodulation unit 513 (for example, a demodulator) through a second terminal of the filter unit 511.

A first terminal of the demodulation unit 513 is coupled to the second terminal of the filter unit 511 for receiving the noise-filtered clock signal CLK2. The demodulation unit 513 can demodulate the clock signal CLK2 to obtain data DATA5 (step S203). When the time length of the corresponding period of the noise-filtered clock signal CLK2 is greater than a reference value, the demodulation unit 513 generates and determines the bit value of the data DATA5 to be the first logic value (i.e. the bit value requiring the bit writing operation, for example, logic 1). When the time length of the corresponding period of the noise-filtered clock signal CLK2 is smaller than the reference value, the demodulation unit 513 generates and determines the bit value of the data DATA5 to be the second logic value (i.e. the bit value not requiring the bit writing operation, for example, logic 0). As that shown in FIG. 6, according to the time length T1 of the period that is greater than the reference value, the demodulation unit 513 generates and determines the bit value of the data DATA5 to be logic 1. According to the time length T2 of the period that is smaller than the reference value, the demodulation unit 513 generates and determines the bit value of the data DATA5 to be logic 0.

After the data DATA5 is demodulated from the clock signal CLK2, the demodulation unit 513 transmits the data DATA5 to the control module 520. An input terminal of the control module 520 is coupled to the demodulation unit 513 for receiving the data DATA5. The control module 520 performs the bit writing operation on the data DATA5 to write the bit value of the data DATA5 into the memory 530 (step S205). The operation method of the control module 520 is the same to that of the control module 320 of the first embodiment, which is not repeated.

After the data DATA5 is written into the memory 530, the processor 540 can read the data DATA5 from the memory 530 for utilization. For example, if the data DATA5 includes a HDCP key, the processor 540 can use the HDCP key recorded in the memory 530 to authenticate, encrypt or decrypt a video stream.

In other embodiments, the data (or information) carried by the modulated clock signal CLK2 may include an encrypted HDCP key. The encrypted HDCP key is obtained by encrypting the original HDCP key in advance by using a reversible logic operation. The number of bits requiring the bit writing operation in the encrypted HDCP key is less than the number of bits requiring the bit writing operation in the original HDCP key. The demodulation unit 513 demodulates the encrypted HDCP key (the data DATA5) from the clock signal CLK2. During the process that the control module 520 writes the encrypted HDCP key into the memory 530, since the number of bits requiring the bit writing operation is reduced, the operation time required for writing the data DATA5 into the memory 530 is shortened. After the processor 540 obtains the encrypted HDCP key from the memory 530, the processor 540 performs the reversible logic operation on the encrypted HDCP key to restore the encrypted HDCP key to the original HDCP key. After obtaining the original HDCP key, the processor 540 uses the original HDCP key to authenticate, encrypt or decrypt the video stream. The reversible logic operation is described later.

In the example of FIG. 1, when the conventional test machine writes data into the OTP memory or the E-fuse in internal of the circuit to be tested, the circuit to be tested generally receives the programming signal generated by the conventional test machine through a bus to control implementation of the bit write operation. However, the conventional test machine has to spend a plenty of time for converting the data to be written (for example, the test pattern) into the programming signal. In the embodiments of FIG. 5 and FIG. 6, the previous-stage circuit (for example, the test machine) of the data processing apparatus 500 is only required to sequentially arrange the data to be written in the clock signal CLK2, and transmits the clock signal CLK2 carrying the data to be written to the converter module 510, and the converter module 510 may demodulate the clock signal CLK2 to generate the corresponding data DATA5 to the control module 520. The control module 520 can generate the programming signal Sprog to the memory 530 according to the data DATA5. Namely, the previous-stage circuit (for example, the test machine) of the data processing circuit 500 is unnecessary to generate the programming signals Sprog. Therefore, the number of the control pins required by the previous-stage circuit (for example, the test machine) is reduced and the time required for converting the test pattern into the corresponding programming signal is saved. Moreover, a data amount of the test pattern generated by the previous-stage circuit (for example, the test machine) of the data processing circuit 500 in the embodiment of FIG. 5 and FIG. 6 can be smaller than a data amount of the test pattern generated by the conventional test machine of the embodiment of FIG. 1. Since the control bus signal of writing the OTP memory or the E-fuse has related timing, the conventional method is required to describe all of the timing information in the test pattern. In case that the data to be written is large, a data amount of the test pattern is generally large. According to the embodiment of FIG. 5 and FIG. 6, it is only required to generate one test pattern sequentially filling the data to be written, so that the data amount of the test pattern is greatly decreased.

Figure 7:
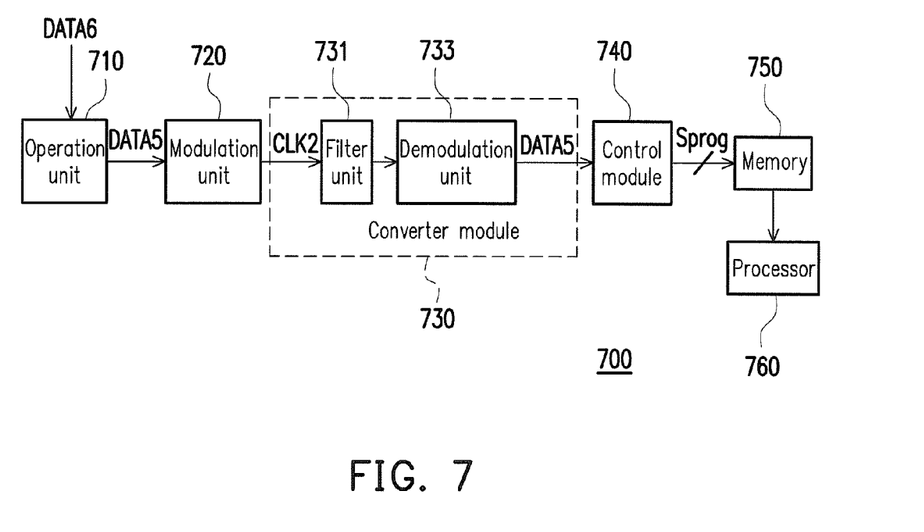
FIG. 7 is a circuit block schematic diagram of a data processing apparatus according to a third embodiment of the invention.

FIG. 7 is a circuit block schematic diagram of a data processing apparatus 700 according to a third embodiment of the invention. Description of the embodiment of FIG. 7 can be deduced with reference of related descriptions of FIG. 5 and FIG. 6. The data processing apparatus 700 includes an operation unit 710, a modulation unit 720, a converter module 730, a control module 740, a memory 750 and a processor 760. The converter module 730 includes a filter unit 731 and a demodulation unit 733. Descriptions of the converter module 730, the filter unit 731, the demodulation unit 733, the control module 740, the memory 750 and the processor 760 of FIG. 7 can be deduced with reference of related descriptions of the converter module 510, the filter unit 511, the demodulation unit 513, the control module 520, the memory 530 and the processor 540 of FIG. 5.

Referring to FIG. 7, an input terminal of the operation unit 710 receives second data DATA6, and performs a reversible logic operation on the second data DATA6 to generate the first data DATA5, and outputs the first data DATA5 to the modulation unit 720, where the number of bits requiring the bit writing operation in the first data DATA5 is less than the number of bits requiring the bit writing operation in the second data DATA6. For example, it is assumed that a logic value of an initial state (not blown state) of a memory cell in the memory 750 is defined to be logic 0, and a logic value of a trim state (blown state) of the memory cell in the memory 750 is defined to be logic 1, the number of bits of logic 1 in the data DATA5 is less than the number of bits of logic 1 in the data DATA6.

An input terminal of the modulation unit 720 is coupled to an output terminal of the operation unit 710 for receiving the data DATA5. An output terminal of the modulation unit 720 is coupled to a clock pin of the converter module 730 for providing the clock signal CLK2 to the converter module 730. The modulation unit 720 defines a first time length T1 and a second time length T2, where the first time length T1 is greater than or equal to a time required for writing the bit value (for example, logic 1 into the memory 750, and the second time length T2 is smaller than the first time length T1. When the bit value of the data DATA5 indicates that the bit writing operation is required, the modulation unit 720 sets the corresponding period in the clock signal CLK2 to the first time length T1. When the bit value of the data DATA5 indicates that the bit writing operation is not required, the modulation unit 720 sets the corresponding period in the clock signal CLK2 to the second time length T2. The modulated clock signal CLK2 can be deduced according to the related description of FIG. 6.

The demodulation unit 733 receives the modulated clock signal CLK2 through the filter unit 731, and demodulates the data DATA5 from the clock signal CLK2, and writes the data DATA5 into the memory 750 through the control module 740. Compared to the data DATA6, since the number of bits of logic 1 in the data DATA5 is decreased, the control module 740 may decrease the operation time required for writing the data DATA5 into the memory 750. After the writing operation of the data DATA5 is completed, the processor 760 can use the data DATA5 in the memory 750. For example, the processor 760 can use a reversible logic operation that is the same to that of the operation unit 710 to restore the data DATA5 in the memory 750 to the data DATA6, where the data DATA6 can be an encryption and decryption key, for example, HDCP key or other encryption and decryption key.

In the present embodiment, the operation unit 710 may include a NOT gate, an XOR gate, an XNOR gate or other logic gates to implement the reversible logic operation. Different embodiments that the operation unit 710 performs the reversible logic operation on the data DATA6 to generate the first data DATA5 are described below.

In some embodiments, the operation unit 710 may provide an operation key, and use the XOR gate to perform an XOR logic operation on the data DATA6 and the operation key to generate the data DATA5. For example, it is assumed that the data DATA6 includes "1100", "1001" and "1101", and the operation key is "1101", the operation unit 710 uses the operation key "1101" to respectively perform the XOR logic operation with "1100", "1001" and "1101" to generate the data DATA5 of "0001", "0100" and "0000". The number of bits of logic 1 in the data DATA6 is 7, and the number of bits of logic 1 in the data DATA5 is 2. Compared to the data DATA6, since the number of bits of logic 1 in the data DATA5 has been decreased, the control module 740 can decrease the operation time required for writing the data DATA5 into the memory 750. After the writing operation of the data DATA5 is completed, the processor 760 can use a reversible logic operation that is the same to that of the operation unit 710 to restore the data DATA5 in the memory 750 to the data DATA6. For example, the processor 760 can use the operation key "1101" to respectively perform the XOR logic operation with "0001", "0100" and "0000" (the data DATA5) in the memory 750 to generate "1100", "1001" and "1101".

For another example, it is assumed that the data DATA6 includes "10011101", "00010101", "11001111" and "10000111", and the operation key is "10011101", the processor 760 uses the operation key "10011101" to respectively perform the XOR logic operation with "10011101", "00010101", "11001111" and "10000111" to generate the data DATA5 of "00000000", "10001000", "01010010" and "00011010". The number of bits of logic 1 in the data DATA6 is 5+3+6+4=18, and the number of bits of logic 1 in the data DATA5 is 0+2+3+3=8. Compared to the data DATA6, the number of bits of logic 1 in the data DATA5 is reduced, so that the control unit 740 can reduce the operation time required for writing the data DATA5 into the memory 750.

In some other embodiments, the operation unit 710 can combine a plurality of HDCP keys to implement the reversible logic operation. For simplicity's sake, it is assumed that one HDCP key has 4 bits. Assuming 8 HDCP keys are respectively "1001", "1101", "0001", "0101", "1100", "1111", "1000" and "0111", and the operation key is "1000 1101 0000 0101", the operation unit 710 may use the operation key "1000 1101 0000 0101" to respectively perform the XOR logic operation with "1001 1101 0001 0101" and "1100 1111 1000 0111" to generate the data DATA5 of "0001 0000 0001 0000" and "0100 0010 1000 0010". Compared to the data DATA6 (i.e. "1001 1101 0001 0101" and "1100 1111 1000 0111"), since the number of bits of logic 1 in the data DATA5 (i.e. "0001 0000 0001 0000" and "0100 0010 1000 0010") has been reduced, the control unit 740 can reduce the operation time required for writing the data DATA5 into the memory 750.

In some embodiments, the operation unit 710 can provide the operation key, and use the XNOR gate to perform an XNOR logic operation on the data DATA6 and the operation key to generate the data DATA5.

In some other embodiments, the operation unit 710 determines whether to perform the reversible logic operation according to the number of bits of logic 1 in the data DATA6. If the number of bits requiring the bit writing operation in the data DATA6 is greater than a reference number, the operation unit 710 can use the NOT gate to perform a NOT logic operation on the data DATA6 to generate the data DATA5.

Figure 8:
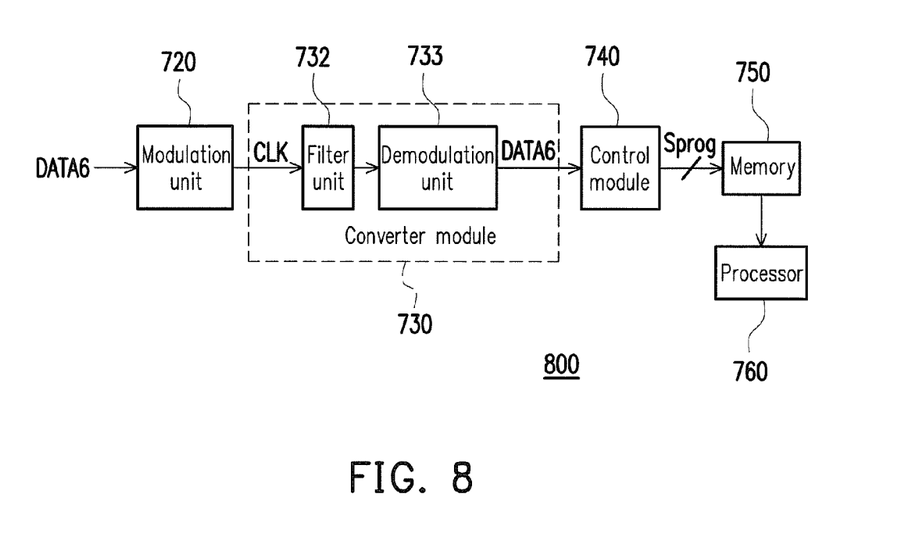
FIG. 8 is a circuit block schematic diagram of a data processing apparatus according to a fourth embodiment of the invention.

FIG. 8 is a circuit block schematic diagram of a data processing apparatus 800 according to a fourth embodiment of the invention. Description of the embodiment of FIG. 8 can be deduced according to related description of the embodiment of FIG. 7. Different to the embodiment of FIG. 7, in the data processing apparatus 800 of FIG. 8, the operation unit 710 of FIG. 7 is omitted. Namely, the modulation unit 720 directly loads the original data DATA6 (for example, the original HDCP key) to the clock signal CLK2. After the demodulation unit 733 receives the modulated clock signal CLK2 through the filter unit 731, the demodulation unit 7333 demodulates the original data DATA6 from the clock signal CLK2, and writes the data DATA6 into the memory 750 through the control module. After the writing operation of the data DATA6 is completed, the processor 760 can directly use the data DATA6 in the memory 750 without additionally performing the reversible logic operation.

In summary, according to the data processing method and the data processing apparatus provided by the embodiments of the invention, the time length of the corresponding period of the clock signal CLK can be used to determine whether the bit value requires the bit writing operation, so as to decrease the time required for writing the bit value into the memory. On the other hand, in some other embodiments of the invention, the reversible logic operation can be used to decrease the number of bits requiring the bit writing operation in the data, so as to further decrease the time required for writing the bit value into the memory.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data processing method, comprising:
   receiving a clock signal through a pin;
   performing a reversible logic operation on original data to generate first data, wherein a number of bits having a first logic value requiring a bit writing operation in the first data is less than a number of bits having the first logic value requiring the bit writing operation in the original data, and a number of bits of the first data is equal to a number of bits of the original data;
   determining a bit value of the first data according to a time length of a corresponding period of the clock signal; and determining whether to perform the bit writing operation into a memory according to the clock signal and the first data, wherein the bit writing operation is performed on the bit value when the bit value of the first data is determined to be the first logic value, and the bit writing operation is not performed on the bit value when the bit value of the first data is determined to be a second logic value.

2. The data processing method as claimed in claim 1, wherein the step of receiving the clock signal comprises:
   filtering a noise in the clock signal.

3. The data processing method as claimed in claim 1, wherein the step of determining the bit value of the first data according to the time length of the corresponding period of the clock signal comprises:
   determining the bit value to be the first logic value when the time length of the corresponding period is greater than a reference value; and
   determining the bit value to be the second logic value when the time length of the corresponding period is smaller than the reference value.

4. The data processing method as claimed in claim 1, wherein the step of determining whether to perform the bit writing operation comprises:
   counting a waiting time for waiting to complete the bit writing operation;
   not to reset the waiting time before the waiting time reaches a rated time of the bit writing operation when the bit value of the first data is the first logic value, so as to perform the bit writing operation on the bit value; and
   not to perform the bit writing operation on the bit value and resetting the waiting time when the bit value of the first data is the second logic value, so as to process a next bit value.

5. The data processing method as claimed in claim 1, further comprising:
   defining a first time length and a second time length, wherein the first time length is greater than or equal to a time require for writing the bit value into the memory, and the second time length is smaller than the first time length;
   setting the corresponding period of the clock signal to the first time length when the bit value of the first data represents that the bit writing operation is required; and
   setting the corresponding period of the clock signal to the second time length when the bit value of the first data represents that the bit writing operation is not required.

6. The data processing method as claimed in claim 1, wherein the reversible logic operation comprises a NOT logic operation, an XOR logic operation or a XNOR logic operation.

7. The data processing method as claimed in claim 6, wherein the XOR logic operation comprises:
   performing the XOR logic operation on the original data and an operation key to generate the first data.

8. The data processing method as claimed in claim 6, wherein the NOT logic operation comprises:
   performing the NOT logic operation on the original data to generate the first data when a number of bits requiring the bit writing operation in the original data is greater than a reference number.

9. The data processing method as claimed in claim 1, further comprising:
   performing the reversible logic operation on the first data to restore the first data to the original data.

10. The data processing method as claimed in claim 1, wherein the original data is an encryption and decryption key.

11. The data processing method as claimed in claim 10, wherein the encryption and decryption key comprises a high-bandwidth digital content protection key.

12. The data processing method as claimed in claim 1, wherein the first data is an encryption and decryption key.

13. The data processing method as claimed in claim 12, wherein the encryption and decryption key comprises a high-bandwidth digital content protection key.

14. A data processing apparatus, comprising:
   a converter circuit, having a first terminal receiving a clock signal, wherein the converter circuit determines a bit value of first data according to a time length of a corresponding period of the clock signal;
   a control circuit, coupled to the converter circuit, and determining whether to perform a bit writing operation into a memory according to the clock signal and the first data, wherein the bit writing operation is performed on the bit value when the bit value of the first data is determined to be a first logic value, and the bit writing operation is not performed on the bit value when the bit value of the first data is determined to be a second logic value;
   a modulation circuit, having an output terminal coupled to the first terminal of the converter circuit for providing the clock signal; and
   an operation circuit, having an output terminal coupled to an input terminal of the modulation circuit, and an input terminal receiving original data, wherein the operation circuit performs a reversible logic operation on the original data to generate the first data to the input terminal of the modulation circuit, wherein a number of bits having the first logic value requiring the bit writing operation in the first data is less than a number of bits having the first logic value requiring the bit writing operation in the original data, and a number of bits of the first data is equal to a number of bits of the original data.

15. The data processing apparatus as claimed in claim 14, wherein the converter circuit comprises:
   a filter circuit, coupled to the first terminal of the converter circuit for receiving the clock signal, and filtering a noise in the clock signal; and
   a sampling circuit, coupled to a second terminal of the converter circuit for receiving a data signal, and coupled to the filter circuit for receiving the noise-filtered clock signal, wherein the sampling circuit samples the data signal according to a timing of the clock signal to obtain and determine a logic value of the first data.

16. The data processing apparatus as claimed in claim 14, wherein the converter circuit comprises:
   a filter circuit, coupled to the first terminal of the converter circuit for receiving the clock signal, and filtering a noise in the clock signal; and
   a demodulation circuit, coupled to the filter circuit for receiving the noise-filtered clock signal, wherein when the time length of the corresponding period of the noise-filtered clock signal is greater than a reference value, the demodulation circuit generates and determines the bit value of the first data to be the first logic value, and when the time length of the corresponding period of the noise-filtered clock signal is smaller than the reference value, the demodulation circuit generates and determines the bit value of the first data to be the second logic value.

17. The data processing apparatus as claimed in claim 14, wherein the control circuit counts a waiting time for waiting to complete the bit writing operation; when the bit value of the first data is the first logic value, the control circuit does not reset the waiting time before the waiting time reaches a rated time of the bit writing operation, so as to perform the bit writing operation on the bit value; and when the bit value of the first data is the second logic value, the control circuit does not perform the bit writing operation on the bit value and resets the waiting time, so as to process a next bit value.

18. The data processing apparatus as claimed in claim 14, wherein the modulation circuit defines a first time length and a second time length, the first time length is greater than or equal to a time require for writing the bit value into the memory, and the second time length is smaller than the first time length, the modulation circuit sets the corresponding period of the clock signal to the first time length when the bit value of the first data represents that the bit writing operation is required, and the modulation circuit sets the corresponding period of the clock signal to the second time length when the bit value of the first data represents that the bit writing operation is not required.

19. The data processing apparatus as claimed in claim 14, wherein the operation circuit comprises at least one of a NOT logic gate, an XOR logic gate and an XNOR logic gate to perform the reversible logic operation.

20. The data processing apparatus as claimed in claim 19, wherein the operation circuit provides an operation key, and the XOR logic gate performs an XOR logic operation on the original data and the operation key to generate the first data.

21. The data processing apparatus as claimed in claim 19, wherein the NOT logic gate performs a NOT logic operation on the original data to generate the first data when a number of bits requiring the bit writing operation in the original data is greater than a reference number.

22. The data processing apparatus as claimed in claim 14, further comprising:
    a processor, coupled to the memory for reading the first data, and performing the reversible logic operation on the first data to restore the first data to the original data.

23. The data processing apparatus as claimed in claim 14, wherein the original data is an encryption and decryption key.

24. The data processing apparatus as claimed in claim 23, wherein the encryption and decryption key comprises a high-bandwidth digital content protection key.

25. The data processing apparatus as claimed in claim 14, wherein the first data is an encryption and decryption key.

26. The data processing apparatus as claimed in claim 25, wherein the encryption and decryption key comprises a high-bandwidth digital content protection key.

* * * * *